United States Patent [19]

Smith

[11] Patent Number: 4,750,360
[45] Date of Patent: Jun. 14, 1988

[54] MECHANICAL SEAL TESTER

[75] Inventor: Martin L. Smith, San Gabriel, Calif.

[73] Assignee: BW/IP International, Inc., Long Beach, Calif.

[21] Appl. No.: 792,416

[22] Filed: Oct. 29, 1985

[51] Int. Cl.⁴ ............................................. G01N 37/00
[52] U.S. Cl. ................................. 73/432.1; 74/571 M
[58] Field of Search ................ 73/865.6, 432.1; 277/2; 74/571 R, 571 M, 836, 840

[56] References Cited

U.S. PATENT DOCUMENTS

| | | | |
|---|---|---|---|
| 321,117 | 6/1885 | Landis . | |
| 2,037,051 | 4/1936 | Smiley | 123/90 |
| 2,190,900 | 2/1940 | VonTavel | 64/25 |
| 3,375,730 | 4/1968 | Antonenko | 74/571 |
| 3,375,732 | 4/1968 | Voeller | 74/571 |
| 3,399,582 | 9/1968 | Henry | 74/571 |
| 3,577,800 | 5/1971 | Jones | 74/571 M |
| 3,798,996 | 3/1974 | Kirschmann | 74/571 |
| 3,945,221 | 3/1976 | Miokovic | 64/24 |
| 4,231,330 | 11/1980 | Garcea | 123/90.15 |
| 4,249,424 | 2/1981 | Glazier | 74/25 |
| 4,421,074 | 12/1983 | Garcea et al. | 123/90.15 |
| 4,538,336 | 9/1985 | Oliver | 74/571 M X |

Primary Examiner—Stewart J. Levy
Assistant Examiner—Joseph W. Roskos
Attorney, Agent, or Firm—Aubrey L. Burgess

[57] ABSTRACT

A mechanical seal testing mechanism having a rotary shaft assembly about which a series of seal assemblies are arranged for simulated testing. The eccentricity of the shaft assembly may be varied while the tester is operating by a fluidically responsive control mechanism such that varying simulated conditions may be imparted to the seal assemblies being tested.

32 Claims, 4 Drawing Sheets

MECHANICAL SEAL TESTER

FIELD OF THE INVENTION

This invention relates to a mechanism for testing mechanical seal assemblies under various, simulated operation conditions and especially to an apparatus for testing seal assemblies under various shaft misalignment conditions.

BACKGROUND OF THE INVENTION

A typical centrifugal pump includes a motor driven shaft which penetrates the pump housing. The shaft is sealed to the housing by a mechanical seal assembly and is supported by either a hydrostatic or other suitable bearing means. During pump operation, the unbalanced radial load at the pump impeller, an inherent characteristic of centrifugal pumps, causes the shaft to shift and/or bend. The shaft may also be displaced in the vertical direction (axial) during operation due to shaft end thrust (pressure loading) and thermal expansion. The magnitude and rate of shaft displacement and/or bending are dependent upon system operating conditions, such as operating temperature, pressure, and pump flow rate. Maximum radial displacement or offset of the shaft occurs close to the position of the seal elements of the seal assembly and affects the performance thereof.

It is well understood that mechanical seal assemblies for use in nuclear and/or toxic fluid assemblies must meet higher standards of durability and "forgiveness" than mechanical seal assemblies used in less exotic applications. It is, therefore, desirable to test a seal assembly for a nuclear reactor pump under simulated conditions rather than in an actual application. In this manner, the manufacturer can readily determine whether the seal assembly is durable for its intended use.

SUMMARY OF THE INVENTION

To this end, the primary object of the present invention is the provision of a seal testing apparatus in which a seal assembly may be subjected to simulated changes in shaft position and orbits, to permit an analysis of whether the seal is durable for its intended use. Moreover, such an apparatus will permit the seal manufacturer and/or user with test equipment which could be used in its own facility for pretesting seals before installation in a nuclear reactor pump.

Among its many features, the testing apparatus of this invention simulates field operating conditions and comprises a unique and specially engineered shaft assembly having a series of seal assemblies arranged thereon. The specially engineered shaft of the present invention allows the test operator to vary the operative rotary path of the shaft assembly. That is, the shaft assembly may be controlled to rotate or turn with little or no eccentricity or, alternatively, can be made to eccentrically rotate in an orbit to simulate the radial displacement or offset of a pump shaft caused by an unbalanced radial load as discussed above. In this manner, and in a test environment, the operator can analyze the seal assembly reaction to such simulated conditions.

The shaft assembly of the present invention is rotatably supported in a stationary frame of a seal tester apparatus. The unique shaft assembly comprises an extended hollow shaft having a bearing or support assembly provided at the free ends thereof and a control mechanism for affecting the rotary path of the shaft. Each bearing or support assembly includes an apertured support member secured to the free end of the shaft and a stub shaft assembly rotatably mounted to said frame. Each stub shaft has a first shaft portion which is received in a support bearing of the frame assembly and a second shaft portion which is eccentrically arranged with respect to the first shaft portion. The eccentric shaft portion of each stub shaft assembly is accommodated in the aperture or bore provided in the support member. The aperture or bore in the support member is eccentrically arranged relative to the longitudinal axis of the extended shaft. One or both of the stub shaft assemblies may be connected to a motor for operably driving the shaft assembly. An operator influenced control mechanism is further provided for controlling the magnitude of shaft displacement. Intermediate the ends of the shaft assembly, an equal series of seal assemblies with their rotating parts to be tested are mounted to the outside diameter of the main shaft.

In addition to controlling the operative effect or rotary path of the shaft assembly, the control mechanism operably couples the extended hollow shaft to the rotatably driven stub shaft assembly. To effect these ends, the control mechanism includes at least one annular piston which is carried within an enclosed space on said shaft and is constrained to move between an intial or minimum position and an extended or maximum position. A first spline connection is provided between the piston and the extended shaft while a second spline connection is established between the piston and a control gear fixed to the driven stub shaft. As the control piston is axially moved, it entail relative angular displacement of the eccentric bore in the support member relative to the eccentric portion of the associated stub shaft. As the control piston causes the above mentioned relative rotation, the operative or total eccentricity of the extended shaft with respect to the stub shaft varies from zero to a maximum value equal to the vector sum of the eccentricity of the support member and the stub shafts.

DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which.

DETAILED DESCRIPTION OF THE PREFERRED EMBODIMENT

Figure 1:
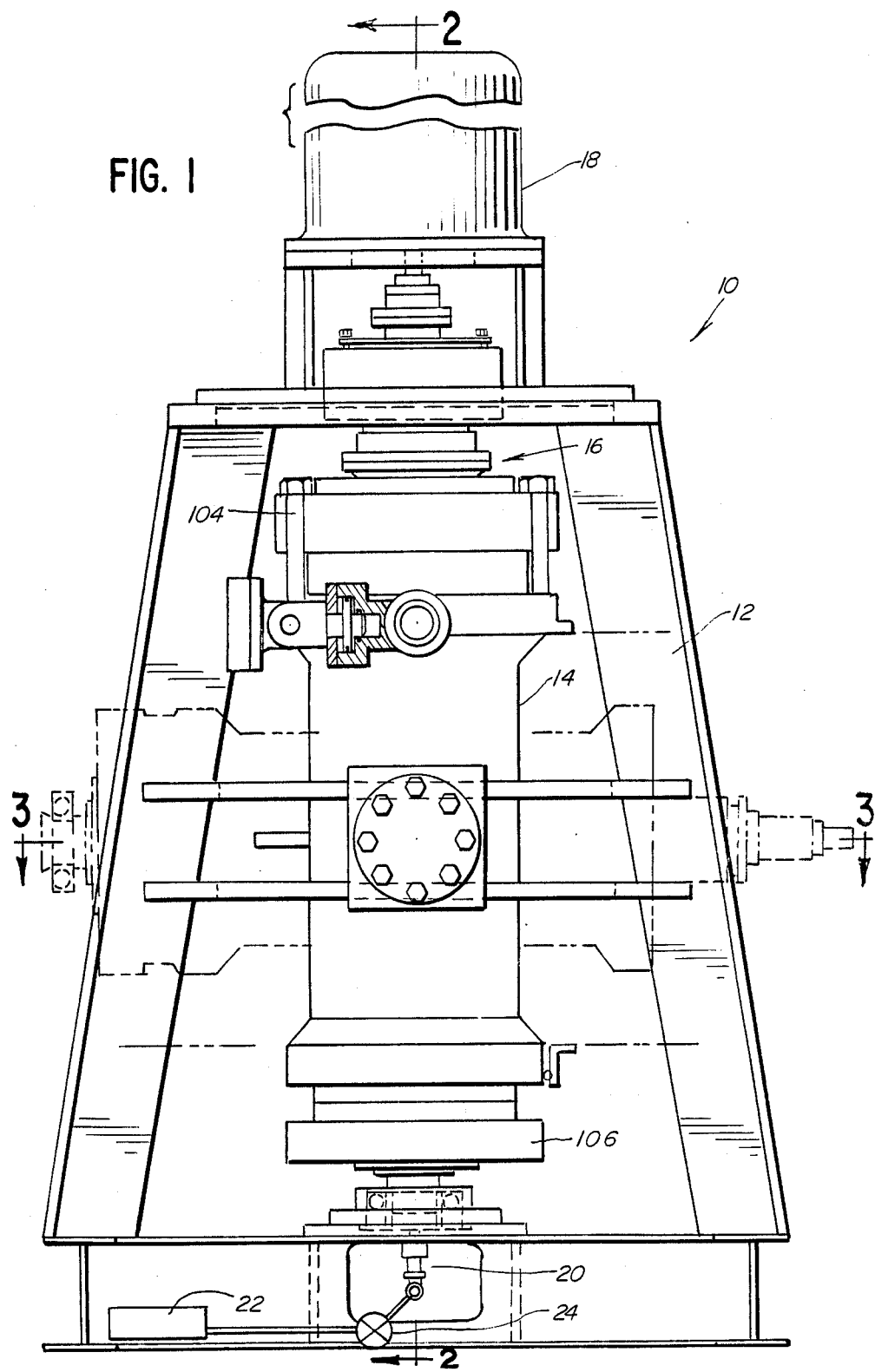
FIG. 1 is a side elevational view of a mechanical seal testing apparatus in which the shaft assembly of the present invention is used.

Referring now to the drawings, wherein line reference numerals indicate like parts throughout the several views, the present invention is schematically illustrated in combination with a mechanical seal testing apparatus 10. It will be appreciated, however, that the apparatus of the present invention has a wide suitable application in imparting orbital motion to a rotary shaft and this disclosure is not intended to overly limit the present invention.

The testing apparatus 10 includes a support frame 12, a test cylinder 14 within the frame 12 and through which the shaft assembly 16 of this invention passes, a motor 18 for rotating the shaft assembly and a swivel 20. In the illustrated embodiment, the swivel 20 is connected to one end of the shaft assembly 16 and to a source 22 of pressurized hydraulic fluid. An operator actuated control valve 24 is arranged between the source of fluid 22 and the swivel 20. The test cylinder 14 is supported by ball bushings 26 shown in FIG. 2, supported on spaced horizontal trunnions 28. A mechanism 30 allows the test cylinder 14 to be tilted to test the schematically illustrated mechanical seal assemblies 32 and 34, disposed within the cylinder 14, under varying conditions. While the supporting trunnions, ball bushings, and tilting mechanism permit various simulated conditions to be imparted to the tested seals, they are not part of the invention to be described herein and are illustrated and referred to for describing the environment in which the present invention finds utility.

Figure 4:
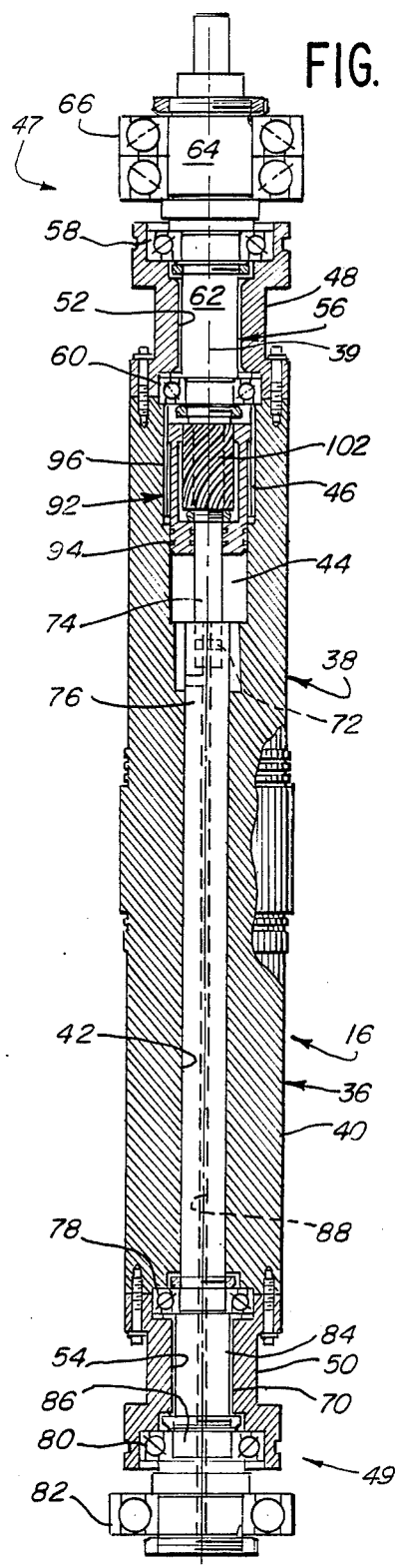
FIG. 4 is a view, partly in cross-section, of the shaft assembly of this invention.
Figure 5:
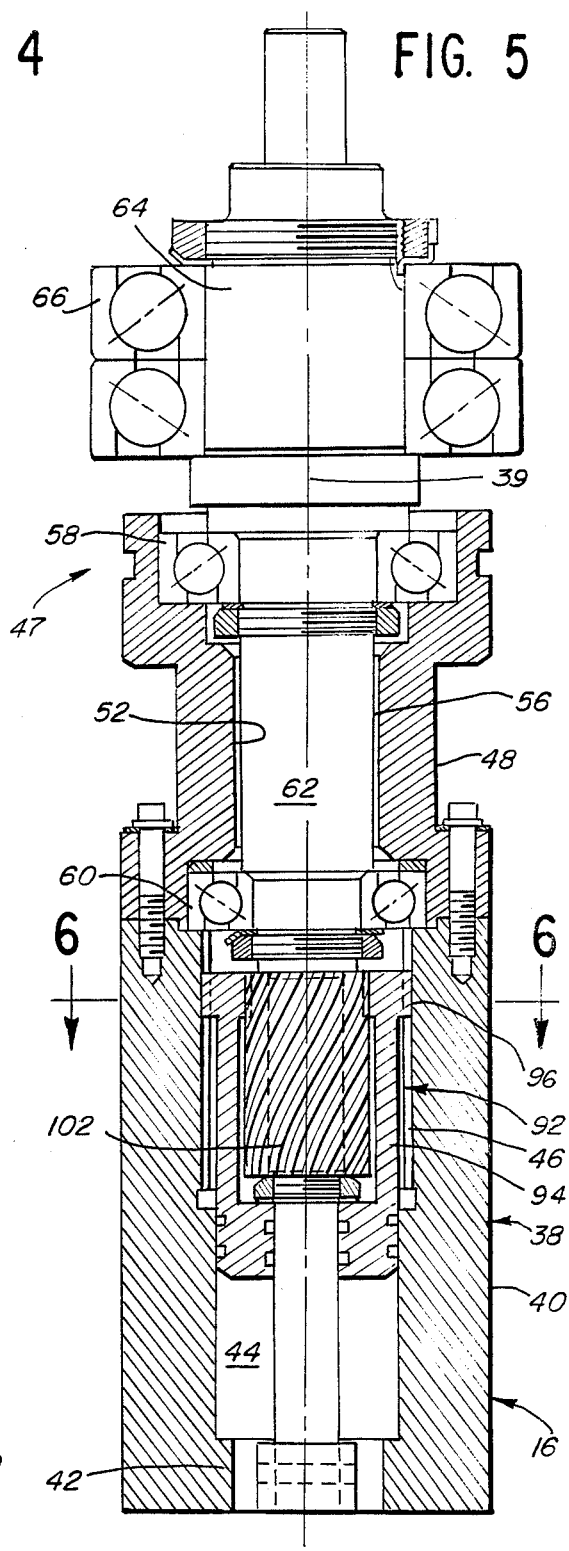
FIG. 5 is an enlarged view, partly in cross-section, of a portion of the shaft assembly of FIG. 4.

The rotary shaft assembly 16 of this invention is particularly illustrated in FIGS. 4, 5 an 6 of the drawings. The shaft assembly 16 includes an extended shaft 38 having a pair of shaft support assemblies 47 and 49 disposed at opposite ends thereof for mounting the shaft assembly to the frame assembly of the apparatus. The extended shaft 38 has a longitudinal axis 39 and is provided with an outside or exterior cylindrical surface 40 and an internal or axial bore 42 extending the length thereof. As best illustrated in FIGS. 4 and 5, the internal bore 42 opens to an enlarged cylindrical and axially arranged cavity or chamber 44 provided at one end of the shaft 38. In the illustrated embodiment, at least a portion of the cavity 44 is provided with internal gear teeth 46.

As was mentioned above, a primary object of this invention is the provision of a tester assembly which may subject mechanical seals to simulated changes in shaft positions and/or orbits. To this end, the shaft support assemblies 47 and 49 combine with a new and unique control mechanism 92 in order that the orbital or rotary path of the shaft 38 may be varied at the will of the operator to subject the seal assemblies 32 and 34 (FIG. 2) mounted about the shaft 38 to simulated field conditions. As will be described in detail hereinafter, each of the shaft support assemblies includes a variable eccentric mechanism which, in combination with the control mechanism 92, imparts the desired degree or magnitude of orbital motion to the shaft 38. The control mechanism 92 is effective to adjust the operative effect of the variable eccentric mechanisms whereby achieving the functional equivalent of having to continually replace a multitude of fixed throw eccentrics normally used for imparting various orbital motions to a shaft. For purposes of this description, the operative radius or eccentricity of the variable eccentric mechanism is that which, in a device utilizing fixed throw eccentrics, would normally be effective to impart the observed magnitude of eccentric rotary or orbital movement to the shaft 38. Furthermore, while the shaft 38 is turning, the control mechanism 92 is capable of effecting a smooth and rapid change in the operative effect said variable eccentric mechanism will have regarding the orbital path traversed by the rotating shaft 38. Thus, unnecessary interruptions in testing the seal assemblies under various shaft misalignment conditions are eliminated.

Each of the shaft support assemblies 47 and 49 includes a bearing carrier, a stub shaft, and means for rotatably supporting each shaft supporting assembly relative to the frame. Specifically, the upper shaft support assembly 47 includes a generally cylindrical carrier 48 which is affixed to one end of the shaft 38. The other and lower bearing support 49 is also provided with a generally cylindrical carrier 50 which is affixed to the opposite end of the shaft 38. To reduce unbalanced forces, the outside diameters of the carriers 48 and 50 are machined to be concentric with the cylindrical outer surface of the shaft 38. Each of the carriers 48 and 50, is provided with a bore 52 and 54, respectively, which is eccentrically arranged relative to the longitudinal axis 39 of the shaft 38. In the preferred embodiment, the eccentricities of the bores 52 and 54 relative to the longitudinal axis of the shaft are substantially similar. It will be appreciated, however, that the eccentricities of the bores relative to the longitudinal axis of the shaft may be different if a different result is desired.

As mentioned, each shaft support assembly further includes a stub shaft. In the illustrated embodiment, the first or upper stub shaft 56 is driven by the motor 18 (FIG. 1). The stub shaft 56 is rotatably supported in spaced bearings 58, 60 carried in the eccentric bore 52 of the bearing carrier 48. The stub shaft 56 is divided into first, second and third shaft sections 62, 64, and 74, respectively. The first shift section or portion 62 of the stub shaft 56 is accommodated for rotation within the carrier 48 and is eccentrically arranged relative to the second shaft portion 64. The second portion 64 is rotatably supported in a shaft assembly thrust bearing 66 housed in a vertical height adjustment mechanism 68 (FIGS. 1 and 2) which is supported by the support frame 12 of the apparatus. The third section 74 is a depending coaxial extension of shaft portion 64 and extends into the bore 42 of the shaft 38 for reasons hereinafter described.

A second and lower stub shaft 70 is provided as part of the other shaft support assembly 49. Like stub shaft 56, this second stub shaft 70 is provided with first, second, and third shaft sections or portions 84, 86, and 76, respectively. The first and second stub shafts 56 and 70 may be operably connected such that shaft eccentricity will be adjusted equally end to end. To connect the stub shafts, the extended portions 76 and 74 of the stub shafts 56 and 70 are pinned or otherwise connected as at 72. The lower stub shaft 70 is rotatably mounted in spaced bearings 78 and 80 carried in the eccentric aperture 54 of the lower bearing carrier 50 and is rotatably supported by the bearing portion 86 which is received in a radial bearing 82 fixed to the support framework 12 (FIG. 2) of the apparatus. The shaft portion 84 of the lower stub shaft 70, arranged between bearings 78 and 80, is formed eccentric to the other portions 76 and 86 of the stub shaft 70. Moreover, the lower stub shaft is provided with a bore 88 which axially extends there-through. The bore 88 permits the cavity 44 in the main shaft 38 to be in fluidic communication with the swivel 20 (FIG. 2) which, in the preferred embodiment, is fixed to the lower end of the shaft 38. In the preferred embodiment, the eccentricity of the stub shaft portions 62 and 84 are substantially similar. It will be appreciated, however, that the eccentricity of these elements can be different if a different effect is desired. Moreover, the magnitude of the eccentricity of the stub shaft portions 62 and 64 is substantially equal to that of the bores 52 and 54 relative to the longitudinal axis 39 of the extended shaft 38.

Figure 6:
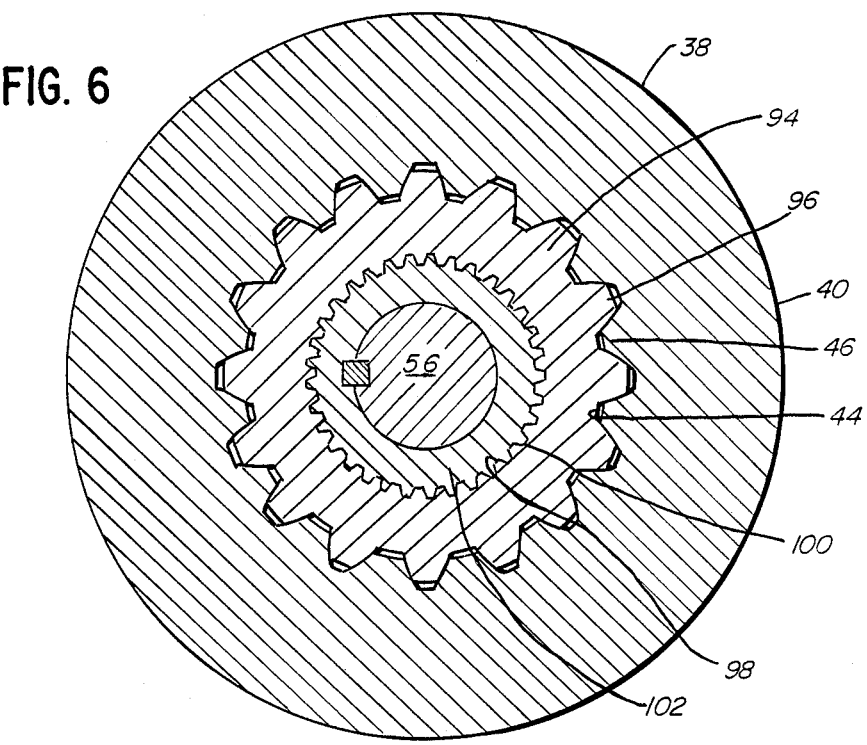
FIG. 6 is a cross-sectional view taken along line 6—6 of FIG. 5.

As mentioned above, the orbital path of travel of the shaft assembly 16 is controlled by a mechanism 92, now to be described. The control mechanism serves a dual purpose: first, it controls the orbital path of the rotating shaft assembly; and, second, it operably couples the extended shaft 38 to the driven stub shaft. In the presently preferred embodiment, the control mechanism 92 includes an annular fluidically responsive piston 94 which axially moves in the chamber 44 between an initial position and an extended position. A first spline connection is established between an outer grooved or toothed surface 96 provided on the piston 94 and a complimentary toothed surface 46 provided in the chamber 44. As best illustrated in FIG. 6, a second spline connection is established between an inner grooved or toothed surface 98 of the piston and the outer toothed surface 100 of control gear 102. The control gear 102 is affixed or keyed to the extended section 74 of the stub shaft 56. In order for the shaft assembly to function in the manner hereinafter described, at least one of the above mentioned spline connections is required to be helicoidal. The interior of the piston 94 is provided with helical gear teeth 98 which engage and mesh with the exterior helical gear teeth 100 of the control gear 102.

Because the shaft support assemblies 47 and 49 are interconnected, a common control mechanism, such as 92, imparts equal degrees of eccentricity to both ends of the shaft assembly 16. The provision of two separate control mechanisms for allowing separate control of each shaft support assembly, however, is within the intended scope of this invention. If two control mechanisms were provided, the operative eccentricity of each end of the shaft 38 could be regulated independently. Moreover, using direct mechanical rather than hydraulic force, for controlling the disposition of the control mechanism is within the spirit of the present invention.

Figure 2:
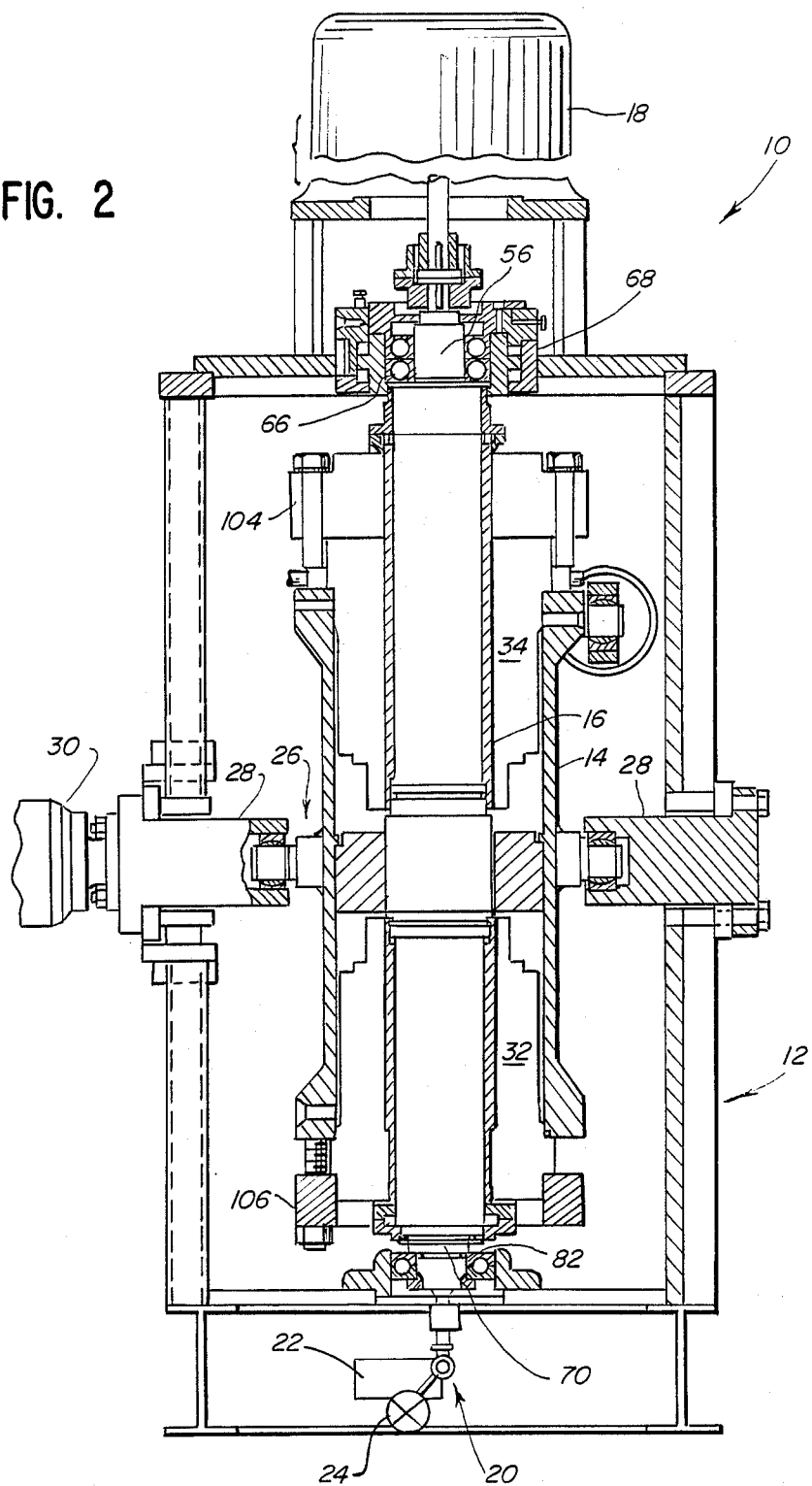
FIG. 2 is a longitudinal cross-sectional view taken along line 2—2 of FIG. 1.
Figure 3:
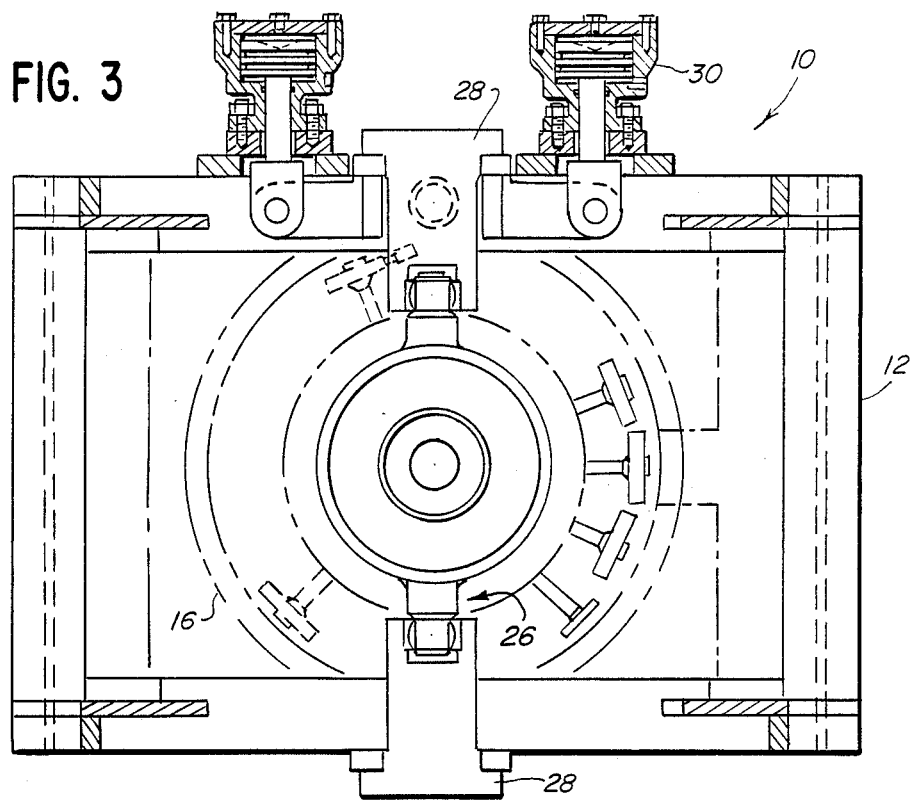
FIG. 3 is a cross-sectional view of the apparatus of FIG. 1 taken along line 3—3 of FIG. 1.

As best illustrated in FIG. 2, two seal cartridges with the same set of mechanical seals, such as previously identified seals 32 and 34, are tested at one time. The seals are preferably placed back-to-back in the seal tester to avoid producing high axial thrusts. Each seal assembly is assembled about the outside diameter of the shaft assembly 16 and is retained by a clamp 104 or 106 bolted to the end of the test cylinder 14.

An exemplary operative sequence of the present invention will now be described. The stub shaft connected to motor 18, through the control gear 102, rotatably drives the extended shaft 38 about its longitudinal axis. When the control piston 94 is disposed in its initial position, the shaft assembly 16 will be rotated about an axis which is coincident with the longitudinal axis 39 of shaft 38 such that a minimum circumferential rotary path of travel for the extended shaft 38 is achieved or effected. On the other hand, when the control piston 94 is disposed in its extended position, the shaft assembly 16 will move in an eccentric or orbital path having a maximum circumferential rotary path of travel for the extended shaft 38.

Absent axial movment of piston 94, the eccentric relationship between the eccentric elements comprising the shaft support assemblies 47 and 49 remains the same for all rotational speeds of the shaft assembly 16. Axial movement, however, of the piston 94 effects a modification of the eccentric relationship between such elements and thereby modifies the operative effect the shaft support assemblies have on the rotational path of shaft 38. Axial movement of the piston is effected by the operator adjusting the pressure in cavity 44. As the piston 94 is forcibly moved under hydraulic pressure, introduced to the chamber 44 through the swivel 20 and interconnecting passageway 88, the piston 94 cannot rotate with respect to the shaft 38 because of the spline connection therebetween. Since the piston 94 cannot rotate with respect to the shaft, the helical control gear 102 must rotate if the piston 94 is to move. Rotation of the helical control gear will likewise affect rotation of the stub shaft with its eccentric crank portion and, thus, cause a modification or change in the eccentric reltionship between eccentric crank portions 62 and 84 of stub shafts 56 and 70, respectively, and the eccentric bores 52 and 54 of the bearing carriers 48 and 50 mounted on the extended shaft 38. Such a change in the mounting structure for the shaft has an effect on the orbital path of the shaft assembly. When hydraulic forces are removed from the piston, for whatever reason, the frictional torque characteristics of the seal assemblies cause the control mechanism 92 to return to its initial position whereat the shaft assembly turns concentrically about the longitudinal axis 39 of the shaft 38. That is, frictional torque applied to the outside diameter 40 of the shaft 38 is converted to an axial force on the piston by the inclined helical teeth on the control gear 102. When hydraulic forces are removed from the piston, this axial force is sufficient to forcibly return the piston to its initial position.

As a skilled artisan will appreciate, the total eccentricity of the shaft 38 with respect to the stub shaft 56, 70 is the vector sum of the stub shafts' eccentricity and the carrier's eccentricity. As the eccentric relationship between the stub shafts' eccentric portions 62, 84 and the eccentric bores 52, 54 changes, the vector sum changes, causing the total eccentricity of the shaft 38 relative to the stub shaft 56, 72 to vary from zero to a maximum value over the total axial travel of the piston 94.

Thus, there has been provided a MECHANICAL SEAL TESTER which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. A mechanical seal testing apparatus comprising:
a generally cylindrical, hollow main shaft;
means to support and rotate said main shaft;
a stub shaft connecting said main shaft and said means to support and rotate said main shaft;

said stub shaft having a first portion eccentric with respect to a second portion;

means rotatably supporting said first portion and generally cylindrical means rotatably supporting said second portion, said means rotatably supporting said second portion being connected to said main shaft and having a bore in which said second portion is located, said bore being eccentric to said main shaft;

a control piston received in said main shaft for axial movement only with respect to said main shaft;

said control piston having internal helical teeth;

a control gear in said control piston having external helical teeth meshing with said internal helical teeth;

means for moving said control piston axially in said main shaft and thereby cause said control gear to rotate the said main shaft relative to said stub shaft and said means rotatably supporting said second portion thereof thus changing the eccentric relationship between the main shaft and the stub shaft.

2. A testing apparatus as claimed in claim 1, in which said main shaft has a bore with axially extending internal teeth and said control piston has external and axially extending teeth meshing with said internal teeth.

3. A testing apparatus as claimed in claim 1, in which said means for moving said control piston comprises a source of hydraulic fluid and means to control the flow of hydraulic fluid to said control piston.

4. A testing apparatus as claimed in claim 1, in which said control gear is connected to said stub shaft.

5. A testing apparatus as claimed in claim 1, further comprising a second stub shaft connected to said first-named stub shaft, said second stub shaft having at least a portion received in said hollow main shaft.

6. A testing apparatus as claimed in claim 5, in which said control piston is received in an enlarged part of said hollow main shaft which defines a piston cavity and further comprising a passageway in said second stub shaft communicating at one end with said piston cavity and at the other end with a source of hydraulic fluid, and means for controlling the flow of hydraulic fluid to said piston cavity.

7. A testing apparatus as claimed in claim 5, in which said second stub shaft has a first portion eccentric with respect to a second portion, and further comprising means rotatably supporting said second stub shaft first portion and generally cylindrical means rotatably supporting the second portion of said second stub shaft, said last-named means being connected to said main shaft and having a bore in which said second portion of said stub shaft is located, said last-named bore being eccentric to said second shaft.

8. A shaft assembly comprising:
a hollow main shaft;
a first stub shaft at one end of said main shaft, a portion of which is eccentric with respect to said main shaft;
a second stub shaft at the other end of said main shaft a portion of which is eccentric with respect to said main shaft;
means connected to said main shaft and encircling said stub shafts;
said encircling means being hollow and having portions thereof which encircle said eccentric portions and are eccentric to said main shaft and to said stub shafts;

means for causing relative rotation between said stub shafts and said main shaft thereby changing the eccentric relationship of said main shaft to said stub shafts.

9. A shaft assembly as claimed in claim 8, further comprising means to rotate said main shaft and said encircling means.

10. A shaft assembly as claimed in claim 8, wherein said means for causing said relative rotation between said stub shafts and said main shaft comprises a control piston operatively associated with said main shaft and a control gear connected to said stub shafts, said control piston being axially movable only and having internal helical teeth, said control gear having external helical teeth meshing with said internal helical teeth, said piston being axially movable to thereby cause said relative rotation between said shafts.

11. A rotary driven shaft assembly for imparting motion to an associated mechanism and which traverses an orbital path which may be modulated while operating, said shaft assembly comprising:
a rotary shaft having a longitudinal axis and a coaxial fluid passageway;
means for rotatably driving said shaft, said drive means including a stub shaft arranged at each end of said shaft, with each stub shaft having an eccentric crank portion and means for imparting rotation to at least one of said stub shafts;
support means carried at each end of said shaft, each support means having an axial bore which is eccentric to the longitudinal axis of said shaft and is telescopically arranged over the eccentric crank portion of said stub shaft;
selectively actuated control mechanism means for changing the relative eccentricity of the eccentric crank portion of said stub shaft and the eccentric bore of said support means in a manner controlling the orbital path of said rotary shaft.

12. The rotary shaft assembly of claim 11, wherein said selectively actuated control mechanism is operable under the influence of a controlled force and moves between an initial position whereat the orbital path of the shaft traverses a minimum circumferential path and an extended position whereat the orbital path of the shaft traverses its maximum circumferential path.

13. The rotary shaft assembly of claim 12, wherein said controlled force is pressurized fluid and operator actuated valve means control the influence of said pressurized fluid on said control mechanism.

14. The rotary shaft assembly of claim 13, wherein said mechanism associated with the rotary shaft assembly is so constructed and arranged that its frictional torque characteristics effectively return the control mechanism toward its initial position when the pressure of said influincing fluid is reduced.

15. The rotary shaft assembly of claim 11, wherein said control mechanism includes an axially slidable piston accommodated within a fluid chamber provided in said rotary shaft, said chamber being in fluid communication with a pressurized source of fluid through the fluid passageway provided in said shaft.

16. The invention of claim 15, wherein an operator actuated valve means is disposed between said axially slidable piston and said pressurized source of fluid.

17. A seal tester assembly comprising:
a shaft mounted for movement in a rotary path and having one or more seal assemblies affixed about the outside diameter thereof, said shaft further includes a longitudinal axis and an axial bore extending the length thereof;

a shaft bearing carrier provided at opposite ends of said shaft and having an axial shaft mounting bore arranged eccentric relative to the longitudinal axis of said shaft;

a pair of stub shafts supported by a frame of the tester assembly, each of said stub shafts having an eccentric crank portion received in the eccentric axial bore of said shaft bearing carrier;

at least one of said stub shafts being connected to a rotary drive means;

means for coupling the driven stub shaft to the shaft such that the rotary path of said shaft may be controlled during operation of the assembly, said coupling means comprising an annular piston provided with an inner grooved surface which engages a grooved surface gear mounted on said driven stub shaft and an outer grooved surface engaging a complimentary inner surface on said shaft, at least one of said grooves on the annular piston and the grooved surface which it engages being helical and the other grooved surface on the annular surface of the piston and the groove with which it engages being longitudinal, said annular piston being controlled to move in an axial sliding direction along the longitudinal axis of the shaft whereby effecting the relative eccentric relationship between the eccentric bore of said shaft bearing and the eccentric portion of said stub shaft to thereby control the rotary path of said shaft.

18. The invention according to claim 17, wherein the axial sliding position of said piston is controlled by fluid pressure.

19. The seal tester assembly according to claim 17 wherein said stub shafts are operably connected to each other such that axial sliding movement of said annular piston equally effects the eccentric relationship between the eccentric bore of said bearing carrier and the eccentric crank portion of said stub shaft simultaneously at both ends of said shaft.

20. The invention according to claim 17, wherein said seal assemblies are so constructed and arranged to have frictional torque characteristics which are actuated by the extended shafts and return the control apparatus toward its initial position when the pressure of the influencing fluid is reduced.

21. A seal tester comprising:

an extended rotary shaft having a longitudinal axis and whose outside diameter provides motion to seal assemblies arranged thereabout;

shaft support means fixed to the free ends of said shaft, each of said support means having a bore arranged eccentric to the longitudinal axis of said shaft;

a pair of stub shafts for supporting and rotating said extended shaft, said stub shafts, having an eccentric crank portion accommodated within the eccentric bore of said support means;

means for rotatably supporting and driving said stub shafts; and a fluid responsive control mechanism carried within an enclosed space on said shaft, said control mechanism including an axially shiftable piston, a first spline connection between said piston and said extended shaft and a second spline connection between said piston and one of said stub shafts at least one of said spline connections being helicoidal and so arranged such that axial displacement of said piston entails relative angular displacement of the eccentric bore in said shaft support means relative to the eccentric portion of said stub shaft thereby effecting the rotary path of said extended shaft.

22. The seal tester assembly according to claim 21, wherein said rotary shaft is so constructed and arranged to have frictional torque characteristics imparted thereto by said seal assemblies in a manner effecting the disposition of said shiftable piston.

23. The seal tester assembly of claim 22, wherein said shaft support means includes a cylindrical body whose outside diameter is concentric with the outside diameter of said shaft but whose bore is arranged eccentric thereto.

24. The seal tester assembly of claim 21, wherein said piston is axially shiftable between initial and extended positions, the initial position of said piston operably effecting a minimum circumference rotary path for said extended shaft with the extended position of said piston operably effecting a maximum circumferential rotary path for said extended shaft.

25. A shaft assembly comprising:

an extended shaft having a longitudinal axis and whose free ends are provided with axial bores arranged eccentric to the longitudinal axis of said shaft;

a stub shaft arranged at each end of said shaft, each stub shaft having an eccentric crank portion which is slidably accommodated in the eccentric axial bore provided at free end of said shaft;

means for rotatably driving at least one of said stub shafts, and at least one control apparatus operably interconnecting the driven stub shaft to said extended shaft and which is capable of modulating the eccentric relationship between the eccentric portion of said stub shafts and the eccentric axial bore provided on the free end of said extended shaft to effect the operative eccentricity of the driven extended shaft.

26. The invention according to claim 25, wherein a shaft bearing support means is affixed at each end of said extended shaft, each of said shaft bearing support means having said eccentric axial bore formed therein.

27. The invention according to claim 25, wherein said extended shaft is mounted for turning movement in a frame of a seal testing unit and wherein a series of seal assemblies are disposed about and are effected by extended shaft motion.

28. The invention according to claim 27, wherein said control apparatus is operable under the influence of a pressurized fluid and moves between initial and extended positions, the initial position of said control apparatus controls the minimum extent of eccentricity of said extended shaft while the extended position of said control apparatus controls the maximum extent of eccentricity of said extended shaft.

29. The invention according to claim 28, wherein valve means control the influence of said pressurized fluid on said control apparatus.

30. The invention according to claim 27, wherein said control apparatus includes an axially shiftable piston accommodated within a fluid chamber formed in said extended shaft, said fluid chamber being in fluid communication with a pressurized source of fluid pressure which controls the axial disposition of the piston.

31. The invention according to claim 30, wherein a valve means is disposed between said axially shiftable piston and said pressurized source of fluid.

32. A shaft assembly rotatably carried by a frame of a machine, said shaft assembly comprising:

an extended rotatably driven shaft having a longitudinal axis;

a pair of shaft support assemblies carried at the ends of said shaft for rotatably mounting same relative to said frame, each of said support assemblies including operative means arranged eccentric relative to the longitudinal axis of said shaft for effecting the path traversed by said shaft when it is rotated; and a regulating assembly operably associatd with at least one of said support assemblies and including an operator influenced control member for changing the operative effect said operative eccentric means have on the path traversed by said shaft when it is rotated.

* * * * *